Jan. 3, 1928.  1,655,190
A. E. LIEPOLD
APPARATUS FOR FEEDING GLASS INTO MOLDS
Filed March 23, 1925  2 Sheets-Sheet 1
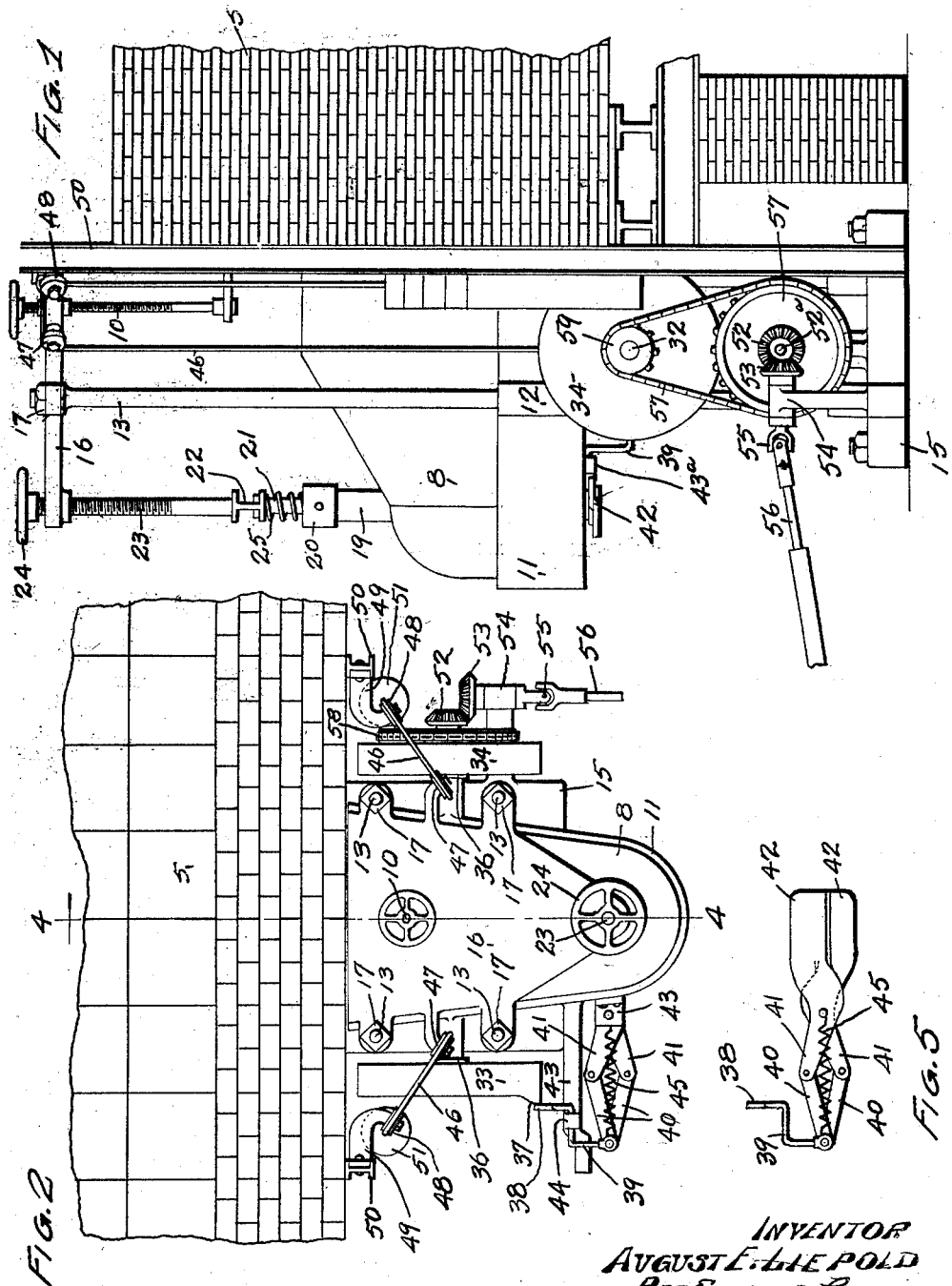
INVENTOR
AUGUST E. LIEPOLD
By Ewing & Lingan
ATTY.

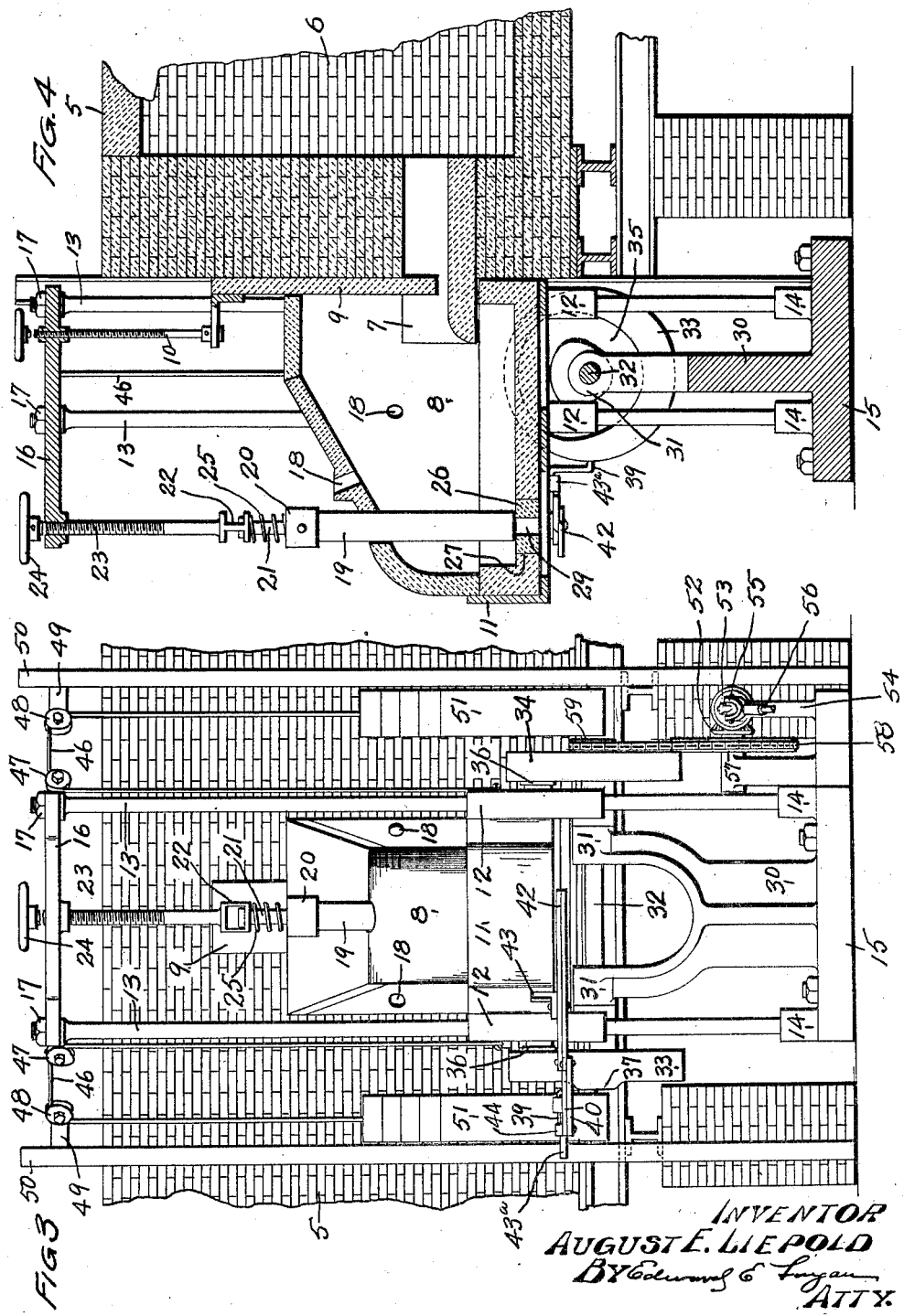

Patented Jan. 3, 1928.

1,655,190

UNITED STATES PATENT OFFICE.

AUGUST E. LIEPOLD, OF ST. LOUIS, MISSOURI, ASSIGNOR, BY MESNE ASSIGNMENTS, TO BALL BROTHERS COMPANY, OF MUNCIE, INDIANA, A CORPORATION OF INDIANA.

APPARATUS FOR FEEDING GLASS INTO MOLDS.

Application filed March 23, 1925. Serial No. 17,585.

My invention relates to improvements in the method and apparatus for feeding glass into molds and has for its primary object a method of feeding gobs of molten glass into molds, which gobs are of substantially uniform temperature throughout and which are uncontacted with and unchilled during their passage from the furnace to the mold.

A further object is the method of feeding gobs of molten glass to the mold of the forming machine in which the severed end of the glass is drawn up and reheated thereby eliminating chill marks in the finished article.

A further object is to construct an apparatus for feeding molten glass into molds, which is so arranged that the gobs of glass are delivered to the mold at substantially furnace temperature and in which the severed end of the mass is drawn upward and reheated by the mass of glass so that all chill marks are eliminated in the finished article.

In the drawings:—

Fig. 1 is a side elevation of my device;
Fig. 2 is a top plan view of the same;
Fig. 3 is a front elevation;
Fig. 4 is a vertical longitudinal section taken on the line 4—4 of Fig. 2; and
Fig. 5 is a top plan view of one formed of severed means.

In the construction of my device, I employ a furnace 5, which is provided with the usual refining chamber 6. The chamber 6 is provided with an outlet spout 7 through which the molten glass flows into a boot or receptacle 8. Extending into the spout 7 is a gate 9, which can be raised or lowered by means of a screw or similar adjusting means 10. The purpose of this gate is to regulate the flow of molten glass from the refining chamber to the boot or receptacle. The lower end of the boot or receptacle is surrounded by a casing 11 which is provided with sleeves 12. Through these sleeves extend rods 13. The rods 13 have their lower ends secured in bosses 14, which are formed integral with a base 15. The upper ends of the rods 13 project through a plate 16, which plate is secured in position by means of nuts 17, which are secured on the upper ends of the rods 13. The sleeves 12 fit sufficiently loose on the rods 13 to permit the casing 11 to be moved up and down as will be hereinafter explained. The boot or receptacle 8 is provided with openings 18 through which heating jets may be introduced so as to prevent any chilling of the glass within the boot or receptacle. Extending into the boot or receptacle is a plug 19, the upper end of which is secured in a socket 20. Projecting from this socket is a stud 21, which in turn is secured in a yoke 22 carried by the adjusting screw 23. The adjusting screw extends through the plate which is provided with a handwheel 24 by means of which the plug is to be regulated up and down. The stud 21 is surrounded by a coil spring 25 which permits a certain amount of resiliency and which will prevent the plug 19 from contacting violently with the bottom of the boot or receptacle, or rather with the bushing 26, which is placed in the opening 27 formed in the bottom of the boot or receptacle. The bushing 26 is provided with an outlet opening 29. This outlet opening may be of various sizes so as to permit more or less molten glass to flow therethrough, this depending, of course, on the size of the gob to be gathered.

Carried by the base 15 is a bracket 30, which is provided with bearings 31. In these bearings is mounted a shaft 32. Mounted on the shaft 32 are wheels 33 and 34 which are provided with cam grooves 35. In these grooves the rollers 36 carried by the casing 11 are adapted to ride and during the revolutions of the wheels 33 the boot or receptacle 8 will be raised and lowered. The wheel 33 is also provided on its outer side with a projection 37, which is designed to come in contact with the end 38 of rods 39. The rods 39 is pivotally secured to one end of the levers 40. The opposite end of these levers are in turn secured to the ends 41 of the shears or cutting mechanism 42, which is pivotally carried by the bracket 43 secured to the casing 11. The rods 39 is carried by an arm 43ª, which is provided with a boss through which the rods slidably extends. The shears 42 are normally held in open position by means of a coil spring 45, which is stretched when the shears are closed as in Figs. 2 and 5, and which on contracting opens the shears. Secured to the casing 11 are cables 46, which pass over sheave wheels 47 carried by the plate 16. The cables 46 also pass over sheave wheels 48, which are carried by brackets 49. These brackets in turn are secured to the buck staves 50. After the cables have been passed over the sheave wheels 48 they have secured thereto counter weights 51, which are approximately the same weight as the combined weight of the boot and the molten glass, and which will relieve the strain on the raising and lowering mechanism.

Secured to the shaft 52ᵃ is a gear wheel 52, which in turn meshes with a gear wheel 53. This gear wheel is carried on a shaft which is mounted in the bearing 54 carried by the base 15. Secured to the shaft carrying gear wheel 53 is a universal coupling 55 to which is attached a telescoping shaft 56, which shaft is in turn connected to the driving mechanism of the mold table (not shown in the drawings) and is for the purpose of placing the mechanism in operation. Mounted on a shaft 52ᵃ is a sprocket wheel 57 around which a chain 58 is secured. This chain also passes around the sprocket wheel 59, which is carried by the shaft 32 for placing the wheels 33 and 34 in rotation thus operating the boot or receptacle up and down.

The operation of my devce is as follows:

The molten glass enters the refining chamber of the furnace in the usual manner. The gate 9 is closed down and the receptacle 8 elevated to its highest position. The plug 19 is screwed down so that it contacts with the bushing 26 closing the discharge orifice 29. The gate 9 is then raised permitting molten glass to flow into the receptacle 8, the mold table brought into position and the device is ready to commence operation.

The handwheel 24 is then turned so as to raise the bottom end of the plug 19 slightly above the bottom of the receptacle 8. This is done to prevent any possibility of the plug 19 pushing the bushing out of the opening 27 but still the space between the bottom of the receptacle and the bottom of the plug 19 is so slight as to permit practically no molten glass to pass through the outlet orifice 29. The driving mechanism of the mold table is then started, which driving mechanism in turn places the wheels 33 and 34 in operation. As these wheels commence to operate, the lever 39 is released from the cam projection 37, which allows the cutting mechanism 42 to open. Continued rotation of the driving mechanism and wheels 33 and 34 lowers the receptacle increasing the distance between the bottom of the plug 19 and the bushing 26 and permitting molten glass to flow through the outlet orifice 29 and into the mold. This distance continues to increase during a certain portion of the revolution of the wheels 33 and 34 until the maximum distance is reached which is regulated by the cam groove 35. The receptacle 8 then commences to ascend causing the bottom of the plug 19 and of the receptacle 8 to approach each other. This movement has a tendency at first to force out molten glass through the opening 29. As the bottom of the plug 19 approaches the bottom of the receptacle 8, the stream of molten glass issuing from the orifice 29 becomes attenuated. At this point the mold table is ready to shift and the cam surface 37 contacts with the lever 39 closing the shearing mechanism 42.

The receptacle 8 remains in this position for a short time only and commences to descend. At this point the shearing mechanism 42 opens and during the first portion of the descent of the receptacle 8 a suction is set up, which draws the severed end of the stream above the shearing mechanism back into the receptacle causing it to become reheated and absorbed by the molten glass within the receptacle. As the receptacle 8 continues to descend this suction is broken and glass once more issues from the orifice. During this replacement of the severed end of the stream within the body of molten glass the molds have been shifted and a fresh mold is beneath the outlet orifice 29 and in position to receive its charge. It will be understood, of course, that the gate 9 is so regulated as to permit the molten glass from the refining chamber to enter the receptacle only sufficiently fast as to keep a constant glass level within the receptacle. This is essential because if the glass flows in too fast, it will accumulate therein and overflow the receptacle and if it flows too slow the receptacle will in a short time be drained.

From the foregoing it will be seen that I formed gobs of glass ready for delivery to the mold of the forming machine by bodily moving a mass of molten glass.

Having fully described my invention, what I claim is:—

1. An apparatus for feeding gobs of molten glass into molds comprising a receptacle having an outlet orifice, means for opening and closing said outlet, means for continuously supplying molten glass to said receptacle, means for imparting a vertical movement to said receptacle, and severing means operated by the receptacle moving means, said severing means being carried by the receptacle and located adjacent said outlet orifice.

2. An apparatus for feeding gobs of molten glass into molds comprising a receptacle having an outlet orifice, adjustable means for opening and closing said outlet, means for imparting a vertical movement to said receptacle to and from said closing means, severing means carried by said receptacle and located below said outlet, and means for continuously feeding a regulated stream of molten glass to said receptacle.

3. An apparatus for feeding gobs of molten glass into molds comprising a receptacle having an outlet orifice, adjustable means extending into said receptacle for opening and closing said outlet, means for imparting a vertical movement to said receptacle whereby said outlet is opened and closed, severing means carried by said receptacle and located below said outlet, and means for feeding a regulated continuous stream of molten glass into said receptacle.

4. An apparatus for feeding gobs of molten glass into molds comprising a receptacle having an outlet orifice, means extending into said receptacle for opening and closing said outlet, means for imparting vertical movement to said receptacle to and from said means whereby the outlet is alternately opened and closed, guides for directing the direction of movement of said receptacle, means for supplying a continuous regulated stream of glass to said receptacle for maintaining the quantity of glass therein constant, and severing means carried by said receptacle and located adjacent said outlet orifice.

5. An apparatus for feeding molten glass into molds comprising a receptacle mounted on guides and provided with an outlet orifice, means for imparting a vertical movement to said receptacle, a counter balance for said receptacle, means extending into said receptacle and adjustably mounted for opening and closing said outlet when said receptacle is raised and lowered, means for continuously feeding a stream of molten glass into said receptacle, means for regulating the volume of said stream of glass so that the quantity of glass in the receptacle remains constant, severing means carried by said receptacle and located adjacent the outlet, and means cooperating with said receptacle moving means for periodically operating said severing means.

6. In an apparatus for feeding gobs of molten glass into molds, a receptacle open at one end, said open end located adjacent the wall of a glass furnace, a discharge opening formed in the bottom of said receptacle, means for supplying a continuous stream of molten glass to said receptacle, means for regulating the rate of flow of said stream, means for imparting vertical reciprocation to said receptacle, a stationary plunger having a blunt end extending into said receptacle and located directly above the discharge opening whereby on the reciprocation of the receptacle the flow of molten glass through said discharge orifice is increased and reduced above and below the normal rate of flow, and severing means carried by said receptacle, said severing means adapted to be operated by the reciprocating means.

7. In an apparatus for feeding molten glass into molds comprising a receptacle open at its rear end and provided in its bottom with a discharge orifice, the open end of said receptacle located adjacent the wall of a glass furnace, means for supplying a regulated continuous stream of molten glass to said receptacle from said furnace, means for imparting a bodily vertical reciprocation to said receptacle, an adjustable stationary plunger having a blunt end extending into said receptacle and located directly above the discharge opening whereby on the reciprocation of the receptacle the flow of molten glass into said orifice will be increased and reduced, and a severing means carried by said receptacle and adapted to be operated by the reciprocating means when the flow of glass has been reduced.

8. In an apparatus for feeding gobs of molten glass into molds, a glass furnace having a discharge outlet in one wall thereof, a receptacle having a discharge outlet in its bottom mounted outside of said furnace and in front of said opening, means for feeding molten glass through said opening into said receptacle in a continuous regulated stream, guides for supporting said receptacle against horizontal or tipping movement, means for imparting a bodily vertical up and down movement to said receptacle, an adjustable plunger extending into said receptacle directly above said discharge opening whereby the flow of glass is increased and retarded by the movement of said receptacle, and a severing means carried by said receptacle and adapted to be operated by the reciprocating means of the receptacle when the flow of glass has been reduced.

9. In an apparatus for feeding molten glass into molds, a glass furnace having a discharge outlet in one wall thereof, a receptacle having a discharge outlet in its bottom and open at one end only mounted outside said furnace, said open end located directly in front of the opening through the furnace wall, means for supplying molten glass in a regulated continuous stream into said receptacle from said furnace, guides for supporting said receptacle adjacent said wall and holding the same against horizontal or tipping movement, means for imparting a vertical up and down movement to said receptacle, an adjustable stationary plunger extending into said receptacle directly above said discharge opening whereby the flow of glass is increased and retarded by the movement of said receptacle, means for yieldingly supporting said plunger whereby breakage of the plunger and receptacle is eliminated in the event the two should contact, severing means carried by said receptacle and extending below the discharge opening, and means co-operating with the raising and lowering means for operating said severing means when said receptacle reaches its uppermost position.

In testimony whereof, I have signed my name to this specification.

AUGUST E. LIEPOLD.